United States Patent [19]
Fielding et al.

[11] 3,872,052
[45] Mar. 18, 1975

[54] POLYPROPYLENE COMPOSITION

[75] Inventors: Ivor R. Fielding, Naperville; Wassily Poppe, Lombard, both of Ill.

[73] Assignee: Standard Oil Company, Chicago, Ill.

[22] Filed: Jan. 25, 1974

[21] Appl. No.: 436,711

[52] U.S. Cl. ...... 260/42.46, 106/288 B, 260/33.2 R
[51] Int. Cl. .............................................. C08f 45/16
[58] Field of Search .................... 260/42.46, 33.2 R; 106/288 B; 423/115, 421

[56] References Cited
UNITED STATES PATENTS
2,993,799   7/1961   Blake ............................... 260/41 R FOREIGN PATENTS OR APPLICATIONS
1,044,502   10/1966   United Kingdom............. 260/41

Primary Examiner—James H. Derrington
Attorney, Agent, or Firm—William H. Magidson; Arthur G. Gilkes; William T. McClain

[57] ABSTRACT

Compositions of improved stiffness comprising resinous polymer of propylene and acicular hydrated sodium aluminum carbonate.

8 Claims, No Drawings

3,872,052

POLYPROPYLENE COMPOSITION

This invention relates to compositions comprising resinous polymers of propylene and acicular hydrated sodium aluminum carbonate.

Resinous polymers of propylene have been used extensively in the fabrication of molded parts. However, it is generally recognized that these polymers are relatively flexible and lack the stiffness desired in some end uses, particularly where the fabricated parts are subjected to a relatively high temperature. For example, most automobile battery cases and motor housings are subject to high temperatures during operation of the associated heat sources. This lack of stiffness is reflected in the relatively low flexural modulus of resinous polymers of propylene.

At the same time, these polymers, particularly homopolymeric polypropylene tend to lack impact resistance, i.e., molded parts break when they are dropped or when a heavy object is dropped on the molded parts. In substance these polymers lack stiffness and are brittle. This brittleness is reflected in their low notched Izod impact value at room temperature. To provide better impact resistance, it is common to use propylene copolymers with ethylene and/or other monomers. Unfortunately, these copolymers have substantially less stiffness than homopolymeric polypropylene. Attempts to improve impact resistance by compounding the propylene homopolymers and copolymers with ethylene-propylene rubbers (including diene modifications) has led to improved impact resistance but lower stiffness and lower heat deflection temperature. The lower the heat deflection temperature and the flexural modulus, the poorer the injection molding properties (cycle time) of the polymer composition.

The general object of this invention is to provide compositions comprising resinous polymers of propylene having improved stiffness. A more specific object of this invention is to provide homopolymeric polypropylene compositions having improved stiffness. Other objects appear hereinafter.

We have now found that the objects of this invention can be attained by compounding resinous polymers of propylene with low levels of acicular hydrated sodium aluminum carbonate ($Na_2O \cdot Al_2O_3 \cdot 2CO_2 \cdot 2H_2O$) also called Dawsonite having a ratio of length to diameter of at least 25:1. Other things being equal, the acicular hydrated sodium aluminum carbonate is markedly superior to other fillers including ground hydrated sodium aluminum carbonate in increasing the stiffness of molded parts fabricated from compositions comprising resinous polymers of propylene including high impact resistant compositions. Further, unlike most filled plastics, it is possible to produce molded products with the filler of this invention having enhanced aesthetic value in the sense that the molded products are translucent rather than opaque. In addition to the foregoing, the addition of the acicular particles of this invention results in compositions having a higher heat deflection temperature and shorter injection molding cycles.

For the purposes of this invention, the term "resinous polymer of propylene" includes polymers containing at least 75% by weight propylene, such as substantially crystalline homopolymeric polypropylene, propylene-ethylene block, random or multi-segment copolymers containing up to 25% by weight ethylene units in the polymer, etc.

The acicular hydrated sodium aluminum carbonate can be used in a concentration of 1 to 25 parts by weight, preferably 2 to 20 parts by weight, per each 100 parts by weight resinous polymer of propylene. The optimum concentration of acicular hydrated sodium aluminum carbonate is dependent upon the resinous polymer of propylene and the other components of the composition. In general, homopolymeric polypropylene containing no impact modifiers requires the least concentration of the acicular filler while homopolymeric polypropylene containing impact modifiers and propylene copolymers require higher concentrations. For example, when 100 parts by weight homopolymeric crystalline polypropylene is blended with about 18 parts by weight ethylene-propylene rubber, the addition of 4 parts by weight acicular hydrated sodium aluminum carbonate provides the composition with about the same level of stiffness as the crystalline homopolymeric polypropylene containing no impact modifiers while the composition retains the improved impact resistance. If more than 25 parts by weight acicular hydrated sodium aluminum carbonate per each 100 parts by weight resinuous polymers of propylene is employed, the composition is too viscous and cannot be injection molded.

The compositions of this invention can contain various conventional additives. Various impact modifiers, such as ethylene-propylene rubber containing at least 40% by weight ethylene, can be used in a concentration of 0 to 35 parts by weight per 100 parts by weight resinous polymer of propylene. Pigments, such as titanium dioxide, stabilizers, fire-retardants, etc. can also be used.

The following examples are merely illustrative.

EXAMPLE I

A series of compositions comprising crystalline homopolymeric polypropylene having a weight average molecular weight of about 450,000 containing either no filler or 1 part by weight filler per each 19 parts by weight stabilized polypropylene were extruded on a 1 inch pelletizing screw extruder having a one-eighth inch strand die maintained at a temperature of 425°F. The samples were tested and the results are set forth below in Table I.

Table I

| Filler | None | Metrotalc | Fybex* | Dawsonite* |
|---|---|---|---|---|
| Izod Impact Strength in ft lbs/inch, ⅛" bar | | | | |
| Notched at 73°F. | 0.33 | 0.77 | 0.63 | 0.67 |
| Notched at −20°F. | 0.28 | 0.35 | 0.33 | 0.32 |
| Unnotched at 73°F. | 25.28 | 24 | No Break | 16 |
| Unnotched at −20°F. | 10.52 | 13 | 11 | 8.7 |
| Flexural Modulus in psi | 183,000 | 284,000 | 317,000 | 369,000 |

Table I —Continued

| Filler | None | Metrotalc | Fybex* | Dawsonite* |
|---|---|---|---|---|
| Rockwell Hardness | 91R | 100R | 99R | 100R |
| Heat Deflection Temp (°F at 66 psi) | 196 | 245 | 242 | 243 |
| Gardner Impact (in—lb at −20°F) | 0–1 | 1 | 4 | 1 |

*Metrotalc stands for talc
*Fybex stands for acicular potassium titanate
*Dawsonite stands for acicular hydrated sodium aluminum carbonate The data shows that while Metrotalc, Fybex and Dawsonite are all effective in improving the stiffness and heat deflection temperature of polypropylene, the acicular hydrated sodium aluminum carbonate is substantially better in improving the stiffness of polypropylene.

EXAMPLE II

This example illustrates the effect of various fillers on the stiffness of polypropylene compositions containing ethylene-propylene rubber impact modifiers. Example I was repeated except that each polypropylene composition contained 20 parts by weight ethylene-propylene-nonconjugated diene rubber (Nordel 1500 which is 25% propylene, 2.7% 1,4-hexadiene and 72.3% ethylene), 0 or 10 parts by weight filler and sufficient stabilized crystalline polypropylene to bring the total composition up to 100 parts by weight. The samples were tested and the results are set forth below in Table II.

EXAMPLE III

Example II was repeated using a crystalline homopolymeric polypropylene having a weight average molecular weight of 380,000. The results are set forth below in Table III.

Table III

| Filler | Flexural Modulus in psi | Heat Deflection Temp in °F at 66 psi |
|---|---|---|
| Metrotalc | 172,000 | 209 |
| PKT | 192,000 | 201 |
| Fybex | 242,000 | 208 |
| Ground Dawsonite | 155,000 | 198 |
| Dawsonite | 370,000 | 224 |

The above data illustrates that acicular hydrated sodium aluminum carbonate is markedly superior to other fillers and even to ground hydrated sodium aluminum carbonate in improving the stiffness of polypropylene compositions.

Table II

| | None | Metrotalc | Fybex | PKT* | Dawsonite |
|---|---|---|---|---|---|
| Izod in ft lbs/in | | | | | |
| Notched 73°F | 1.23 | 2.20 | 1.65 | 1.86 | 2.30 |
| Notched −20°F | .84 | .63 | .41 | .69 | .59 |
| Unnotched 73°F | No Break | No Break | No Break | 21 | 19 |
| Unnotched −20°F | 32 | No Break | 15 | 12 | 9.10 |
| Flexural Modulus (psi) | 144,000 | 190,000 | 241,000 | 205,000 | 358,000 |
| Rockwell Hardness | 74R | 65R | 61R | 66R | 67R |
| Heat Deflection Temp (°F at 66 psi) | 189 | 219 | 197 | 204 | 222 |
| Gardner Impact (in—lb at −20°F) | 50–55 | 94–96 | 100–102 | 34 | 32 |

*PKT stands for potassium titanate

The above data illustrates that while the impact resistance of polypropylene compositions can be improved by the addition of an impact modifier, the stiffness of the composition decreases and acicular hydrated sodium aluminum carbonate is markedly superior to other fillers in imparting stiffness to polypropylene compositions containing impact modifiers.

EXAMPLE IV

This example illustrates the effect of acicular hydrated sodium aluminum carbonate on a high impact propylene-ethylene copolymer (96% by weight propylene) having a weight average molecular weight of 450,000. The stabilized propylene copolymer alone or blended with 1 part by weight Dawsonite per each 19 parts by weight propylene copolymer was extruded in the manner described in Example I. The unfilled copolymer had a flexural modulus of 151,000 psi and 182°F heat deflection temperature while the filled copolymer had a flexural modulus of 249,000 psi and 220°F heat deflection temperature.

EXAMPLE V

This example illustrates the effect of acicular hydrated sodium aluminum carbonate on the stabilized high impact propylene-ethylene copolymers of Example IV which contains additional impact modifiers. The impact modifier and either 0 or 5 parts by weight Dawsonite were blended with sufficient propylene-ethylene copolymer to bring the total composition up to 100 parts by weight. The compositions were extruded in the manner described in Example I and the results are set forth below in Table IV.

Table IV

| Impact Modifier | Parts By Weight Modifier | Parts By Weight Dawsonite | Flexural Modulus in psi | Heat Deflection Temp. |
|---|---|---|---|---|
| SP-992 EPR* | 8 | 0 | 130,000 | 186°F |
| SP-992 EPR* | 8 | 5 | 214,000 | 197°F |
| Renex 36* | 4 | 0 | 123,000 | 191°F |
| Renex 36* | 4 | 5 | 255,000 | 197°F |
| SP-992 EPR*) Renex 36* ) | 4 4 | 0 | 119,000 | 175°F |
| SP-992 EPR*) Renex 36* ) | 4 4 | 5 | 229,000 | 185°F |

*SP-992 EPR stands for an ethylene-propylene rubber containing 40% propylene and 60% ethylene
*Renex 36 stands for polyoxyethylene (6) tridecyl ether The above data illustrates that acicular hydrated sodium aluminum carbonate is effective in improving the stiffness of resinous polymers of propylene containing impact modifiers.

We claim:

1. A composition having improved stiffness comprising a resinous polymer of propylene and an acicular hydrated sodium aluminum carbonate in a concentration of 1 to 25 parts by weight per 100 parts by weight resinous polymer of propylene, wherein said hydrated sodium aluminum carbonate has a ratio of length to diameter of at least 25:1.

2. The composition of claim 1, wherein said resinous polymer of propylene comprises a homopolymer of propylene.

3. The composition of claim 2, wherein said composition comprises an impact modifier.

4. The composition of claim 3, wherein said impact modifier comprises an ethylene-propylene rubber.

5. The composition of claim 4, wherein said ethylene-propylene rubber is an ethylene-propylene-diene rubber.

6. The composition of claim 1, wherein said resinous polymer of propylene comprises a copolymer of propylene and ethylene containing at least 75% by weight propylene.

7. The composition of claim 6, wherein said composition comprises an impact modifier.

8. The composition of claim 7, wherein said impact modifier comprises an ethylene-propylene rubber.

* * * * *